(12) United States Patent
Kang

(10) Patent No.: US 12,371,324 B2
(45) Date of Patent: Jul. 29, 2025

(54) CARBON-SILICON COMPOSITE AND PREPARATION METHOD THEREFOR

(71) Applicant: TOKAI CARBON KOREA CO., LTD, Gyeonggi-do (KR)

(72) Inventor: Seok Min Kang, Gyeonggi-do (KR)

(73) Assignee: Tokai Carbon Korea Co., Ltd. (KR)

( * ) Notice: Subject to any disclaimer, the term of this patent is extended or adjusted under 35 U.S.C. 154(b) by 0 days.

(21) Appl. No.: 18/039,762

(22) PCT Filed: Nov. 22, 2021

(86) PCT No.: PCT/KR2021/017124
§ 371 (c)(1),
(2) Date: Jun. 1, 2023

(87) PCT Pub. No.: WO2022/119197
PCT Pub. Date: Jun. 9, 2022

(65) Prior Publication Data
US 2024/0025746 A1  Jan. 25, 2024

(30) Foreign Application Priority Data
Dec. 1, 2020  (KR) .......................... 10-2020-0165741

(51) Int. Cl.
C01B 32/05  (2017.01)

(52) U.S. Cl.
CPC .......... C01B 32/05 (2017.08); *C01P 2004/03* (2013.01); *C01P 2004/61* (2013.01); *C01P 2004/64* (2013.01); *C01P 2004/80* (2013.01); *C01P 2006/90* (2013.01)

(58) Field of Classification Search
CPC ...................................... C01B 32/05
See application file for complete search history.

(56) References Cited

U.S. PATENT DOCUMENTS

2020/0280062 A1*  9/2020  Shin ..................... H01M 4/1395
2023/0352665 A1*  11/2023  Park ..................... H01M 4/1395

OTHER PUBLICATIONS

International Search Report mailed Mar. 2, 2022 for Application No. PCT/KR2021/017124 (three (3) pages).

* cited by examiner

*Primary Examiner* — William D Young
(74) *Attorney, Agent, or Firm* — KDW Firm PLLC

(57) ABSTRACT

The present invention relates to a carbon-silicon composite and a preparation method therefor. An aspect of the present invention provides a carbon-silicon composite comprising: a core including a carbon material and silicon particles; and a shell which is formed on the surface of the core and includes amorphous carbon, wherein the silicon particles are uniformly distributed from the center to the surface of the core.

13 Claims, 9 Drawing Sheets

CARBON-SILICON COMPOSITE AND PREPARATION METHOD THEREFOR

CROSS-REFERENCE TO RELATED APPLICATIONS

This application is a national phase entry of, claims the benefit of and priority to previously filed International Patent Application No. PCT/KR2021/017124, entitled "CARBON-SILICON COMPOSITE AND PREPARATION METHOD THEREFOR," filed Nov. 22, 2021, which claims priority to Korean Patent Application No. 10-2020-0165741 filed Dec. 1, 2020, which are hereby incorporated by reference in their entireties.

TECHNICAL FIELD

The following disclosure relates to a carbon-silicon composite and a method of preparing the same.

BACKGROUND ART

As the price of energy sources increases due to the depletion of fossil fuels and interest in environmental pollution is enlarged, eco-friendly alternative energy sources are becoming indispensable factors for future life. In particular, as technology development and demand for mobile devices increase, demand for secondary batteries as an eco-friendly alternative energy source is rapidly increasing.

Among them, lithium secondary batteries are widely commercialized and used since they exhibit high energy density and operating potential, have a long cycle life, and have a low self-discharge rate. The application of the lithium secondary batteries is expected to be expanded currently from digital devices such as laptops and mobile phones to electric vehicles, hybrid vehicles, space and aviation fields, and energy storage systems.

Accordingly, research to implement a high-capacity lithium secondary battery is being actively conducted.

Conventionally, lithium metal has been used as the anode of a lithium secondary battery, but as the battery short circuit due to the formation of dendrites and the risk of explosion due to this become a problem, and the use of carbon-based active materials that make intercalation and deintercalation of reversible lithium ions possible and maintain structural and electrical properties has emerged.

Although such carbon-based active materials provide many advantages in terms of energy density of lithium batteries, there are problems such as limitations in theoretical maximum capacity, safety problems, and decrease in battery productivity due to the hydrophobicity of carbon-based compounds.

In order to solve these problems, silicon (Si) or silicon compounds have been reviewed as a high-capacity material that may replace the carbon-based active materials, but most silicon anode materials expand the volume of silicon by up to 300% due to lithium intercalation, due to this, the anode is destroyed to cause a problem in that high cycle characteristics are not exhibited.

In addition, even when silicon or a silicon compound is added to a carbon-based active material and used, since the content of silicon is inevitably limited to a maximum of 10% due to electrode short-circuits, cracks, and reduced lifespan due to swelling of silicon during charging and discharging, there is a problem in that it is difficult to overcome the limitation of the capacity.

DISCLOSURE OF THE INVENTION

Technical Goals

The present disclosure is to solve the above-mentioned problems, and one aspect of the present disclosure is to provide a carbon-silicon composite which has a high content of silicon particles and may suppress volume expansion due to silicon, as an anode material for realizing a high-capacity lithium secondary battery, and a method of preparing the same.

However, technical goals to be achieved are not limited to those described above, and other goals not mentioned above are clearly understood by one of ordinary skill in the art from the following description.

Technical Solutions

One aspect of the present disclosure provides a carbon-silicon composite including: a core containing a carbon material and silicon particles; and a shell formed on the surface of the core and including amorphous carbon, crystalline carbon, or both, wherein the silicon particles are uniformly distributed from the center to a surface of the core.

According to one example embodiment, the silicon particles may be contained in the core in an amount of 10% by weight (wt %) to 50 wt %.

According to one embodiment, the carbon material and the silicon particles may have a content ratio of 9:1 to 1:1.

According to one example embodiment, a difference between a silicon particle content ratio at a portion within 20% from the center of the core in a distance from the center to the surface of the core in the core and a silicon particle content ratio at the other portion of 80% from the center of the core may be less than 5%.

According to one example embodiment, the silicon particles may have a size of nm to 100 nm.

According to one example embodiment, the carbon material may include at least one selected from the group consisting of natural graphite, artificial graphite, soft carbon, hard carbon, carbon black, acetylene black, Ketjen black, carbon fiber, carbon nanotube, graphene, and expanded graphite.

According to one example embodiment, the crystalline carbon may be included in the shell in an amount of 40 wt % to 60 wt %.

According to one example embodiment, the carbon-silicon composite may have a size of 3 μm to 12 μm.

According to one example embodiment, the carbon-silicon composite may have a porosity of 1% to 10%.

Another aspect of the present disclosure provides a method of preparing a carbon-silicon composite, the method including the steps of: mixing a carbon material and silicon particles; forming a core by applying a shear force to the mixed carbon material and silicon particles; forming a shell by applying a coating solution containing amorphous carbon to a surface of the core; and crystallizing a portion or all of amorphous carbon by applying heat to the formed shell.

According to one example embodiment, the carbon material may have pores formed therein by the shear force, and the silicon particles may be penetrated into the carbon material.

Another aspect of the present disclosure provides a lithium-ion battery electrode including the carbon-silicon composite or a carbon-silicon composite prepared by the method of preparing the carbon-silicon composite.

According to one example embodiment, the electrode may have a volume expansion rate of 50% or less, and the volume expansion rate may be measured by comparing a thickness of an electrode measured before charging and discharging and the thickness of the electrode measured after 100 cycles of discharging based on 0.5 C-rate.

According to one embodiment, the electrode may have a capacity of 600 mAh/g to 1,680 mAh/g.

According to one example embodiment, the electrode may have an initial Coulombic efficiency of 80% or more.

Effects

A carbon-silicon composite according to the present disclosure may have a form including a core in which silicon particles are distributed inside a carbon material so that they are uniformly dispersed throughout, and an amorphous carbon shell which is formed on the surface of the core, thereby having effects capable of suppressing the expansion of silicon, increasing the content of silicon in the composite, and securing mechanical strength.

In addition, a method of preparing a carbon-silicon composite according to the present disclosure may apply shear force to enable silicon particles to be uniformly attached and distributed inside a carbon material, and form pores inside the carbon material so that the amount of silicon contained in the composite is increased in a simple process, and a structure capable of suppressing the expansion of the silicon particles may be formed.

In addition, a lithium-ion battery electrode including a carbon-silicon composite according to the present disclosure may have a high content of silicon so that a high capacity of a battery may be implemented, and may have an effect of suppressing volume expansion of an electrode due to swelling of silicon.

BEST MODE FOR CARRYING OUT THE INVENTION

Figure 1:
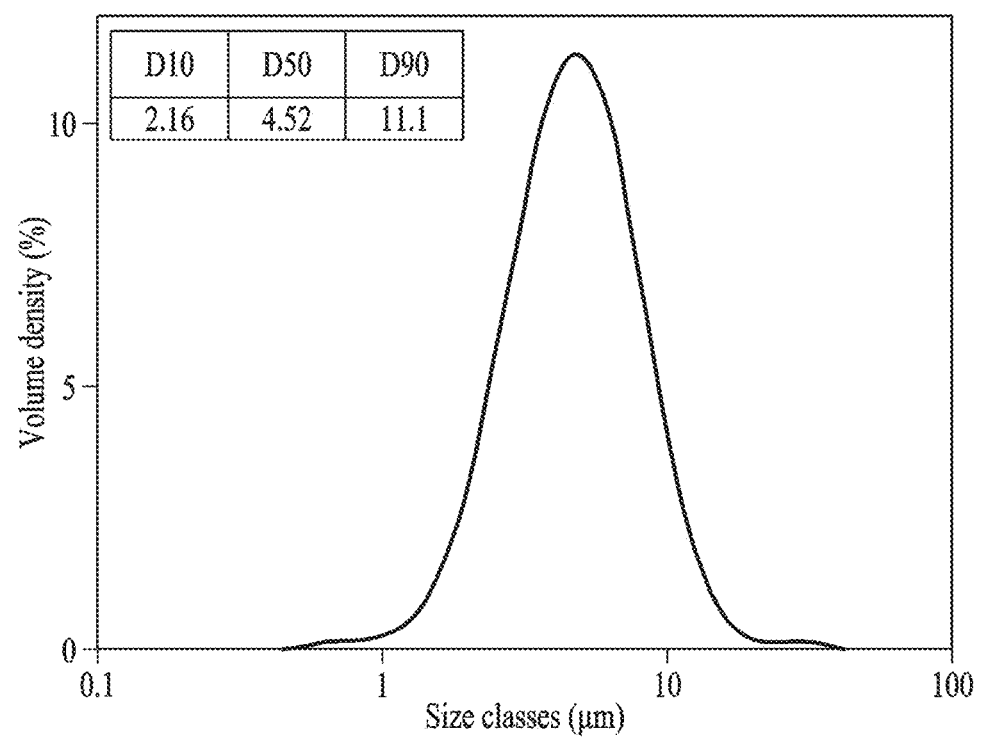
FIG. 1 is a graph analyzing the particle size distribution of a graphite-silicon composite according to an embodiment of the present disclosure.

Hereinafter, embodiments will be described in detail with reference to the accompanying drawings. However, since various changes may be made to the embodiments, the scope of rights of the patent application is not restricted or limited by these embodiments. It should be understood that all modifications, equivalents and substitutes for the embodiments are included in the scope of the rights.

The terms used in the embodiments are used for the purpose of description only, and should not be construed as an intention to limit the present disclosure. The singular expression includes the plural expression unless the context clearly dictates otherwise. In the present specification, it should be understood that a term such as "includes", "have", or the like is intended to designate that a feature, a number, a step, an operation, a component, a part, or a combination thereof described in the specification exists, but it does not preclude the possibility of existence or addition of one or more other features, numbers, steps, operations, components, parts, or combinations thereof.

Unless defined otherwise, all terms used herein, including technical or scientific terms, have the same meaning as those commonly understood by one of ordinary skill in the art to which the embodiments belong. Terms such as those defined in a commonly used dictionary should be interpreted as having a meaning consistent with the meaning in the context of the related art, and should not be interpreted in an ideal or excessively formal meaning unless explicitly defined in the present application.

Further, in the description of the embodiments, if it is determined that a detailed description of a related known technology may unnecessarily obscure the gist of the embodiments, the detailed description will be omitted.

Hereinafter, the carbon-silicon composite according to the present disclosure and a method of preparing the same will be described in detail with reference to embodiments and drawings. However, the present disclosure is not limited to these embodiments and drawings.

One aspect of the present disclosure provides a carbon-silicon composite including: a core containing a carbon material and silicon particles; and a shell which is formed on the surface of the core and includes amorphous carbon, crystalline carbon, or both, wherein the silicon particles are uniformly distributed from the center to the surface of the core.

The carbon-silicon composite according to the present disclosure has an effect capable of effectively suppressing volume expansion due to silicon while increasing the silicon content in the composite by uniformly dispersing silicon particles into the carbon material.

The silicon particles are uniformly distributed from the center to the surface of the core, and for example, the content ratio of the silicon particles to the carbon material from the center to the surface of the core may be shown to be within a uniform range.

According to one example embodiment, the silicon particles may be contained in the core in an amount of 10% by weight (wt %) to 50 wt %.

Desirably, the silicon particles may be contained in an amount of 20 wt % to 40 wt %.

If the silicon particles are contained in an amount less than the above range, it may be difficult to realize a high capacity of the battery when the carbon-silicon composite is used as a lithium-ion battery anode material, and if the silicon particles are contained in an amount exceeding the above range, the volume expansion rate of the electrode after charging and discharging the battery may increase by 50% or more.

According to one example embodiment, the carbon material and the silicon particles may have a content ratio of 9:1 to 1:1.

Desirably, the carbon material and the silicon particles may have a content ratio of 4:1 to 3:2.

If the content ratio of the carbon material and the silicon particles is out of the content range, when the carbon-silicon composite is used a lithium-ion battery anode material, it may be difficult to realize a high capacity of the battery, and the volume expansion rate of the electrode after charging and discharging the battery may increase by 50% or more.

According to one example embodiment, a difference between a silicon particle content ratio at a portion within 20% from the center of the core in a distance from the center to the surface of the core in the core and a silicon particle content ratio at the other portion of 80% from the center of the core may be less than 5%.

That is, the content ratios of the silicon particles may be shown to be almost the same ranging from the center to the surface of the core in the core.

The carbon-silicon composite according to the present disclosure shows almost the same content ratios of the silicon particles ranging from the center to the surface of the core so that an electrode material having excellent cycle characteristics with high capacity may be prepared.

According to one embodiment, the silicon particles may have a size of 20 nm to 100 nm.

The size may be a diameter, a radius, a maximum length, or the like depending on the shape of the particles.

If the silicon particles have a size of less than 20 nm, it is difficult to express a high capacity during electrode formation, and side reactions with the electrolyte may increase, resulting in reduced lifespan performance. If the silicon particles have a size of exceeding 100 nm, expansion of silicon may not be suppressed.

According to one example embodiment, the carbon material may include at least one selected from the group consisting of natural graphite, artificial graphite, soft carbon, hard carbon, carbon black, acetylene black, Ketjen black, carbon fiber, carbon nanotube, graphene, and expanded graphite. Desirably, the carbon material may include graphite.

According to one example embodiment, the shell may have a thickness of 2 nm to 1 µm.

If the shell has a thickness of less than 2 nm, the stability of the carbon-silicon composite may deteriorate, and if the shell has a thickness of exceeding 1 µm, the reaction with lithium is inhibited during charging and discharging so that it may be difficult to expect a high capacity during high rate charging and discharging.

According to one example embodiment, the crystalline carbon may be included in the shell in an amount of 40 wt % to 60 wt %.

If crystalline carbon is contained in an amount of less than 40 wt %, the mechanical strength of the carbon-silicon composite may decrease, and if it is contained in an amount of exceeding 60 wt %, destruction of the composite may occur due to volume expansion during charging and discharging so that problems of a decrease in capacity and deterioration of rapid cycle properties may occur.

The amorphous carbon may be prepared from carbon precursors including sucrose, phenolic resin, naphthalene resin, polyvinyl alcohol resin, furfuryl alcohol resin, polyacrylonitrile resin, polyamide resin, furan resin, cellulose resin, styrene resin, polyimide resin, epoxy resin or vinyl chloride resin, coal-based pitch, petroleum-based pitch, polyvinylchloride, mesophase pitch, tar, block-copolymers, polyols and low molecular weight heavy oils, or mixtures thereof.

According to one example embodiment, the carbon-silicon composite may have a size of 3 µm to 12 µm.

The size may be a diameter, a radius, a maximum length, or the like depending on the shape of the composite.

If the size of the carbon-silicon composite is less than 3 µm, the composite formation process may not be easy, and the specific surface area may be widened due to the increase in fine powder, which may cause a decrease in capacity as the amount of the binder increases during electrode manufacturing.

In addition, when the carbon-silicon composite has a size of exceeding 12 lam, the electrode density may be lowered due to spaces between the composites during electrode formation.

According to one example embodiment, the carbon-silicon composite may have a porosity of 1% to 10%, desirably, 1% to 7%.

If the porosity of the carbon-silicon composite is less than 1%, the formation of a pore structure is not sufficient, and the effect of inhibiting volume expansion may be reduced. If the porosity exceeds 10%, the possibility of occurring side reactions may increase due to the formation of excessive pores.

According to one embodiment, the porosity may be defined as follows.

Porosity=pore volume per unit mass/(specific volume+ pore volume per unit mass)

The measurement of the porosity is not particularly limited, and according to one embodiment of the present disclosure, it may be measured by the BET method using an adsorption gas such as nitrogen or the like.

The pores are ones which are formed inside the carbon-silicon composite to serve as a buffer to mitigate the volume expansion of silicon, and may suppress the volume expansion of the electrode.

In addition, since the pores may be impregnated with a non-aqueous electrolyte solution, and thus, lithium ions may be injected into the anode active material, diffusion of lithium ions may occur efficiently to have an effect of enabling high rate charge and discharge.

The pores have a very fine average particle diameter and are uniformly distributed throughout with the silicon particles so that when the silicon particles are alloyed with lithium and expand in volume, it is possible to expand them while compressing the volume of the pores, causing no significant change in appearance.

Another aspect of the present disclosure provides a method of preparing a carbon-silicon composite, the method including the steps of: mixing a carbon material and silicon particles; forming a core by applying a shear force to the mixed carbon material and silicon particles; forming a shell by applying a coating solution containing amorphous carbon to a surface of the core; and crystallizing a portion or all of amorphous carbon by applying heat to the formed shell.

The method of preparing a carbon-silicon composite according to the present disclosure applies shear force so that the silicon particles may be uniformly attached and distributed inside the carbon material, and the pores may be uniformly formed in the composite.

According to one example embodiment, in the step of mixing of the carbon material and the silicon particles, the mixing may be overmixing, and the overmixing may be mixing performed by a milling process.

The milling process may be performed using any one or more of a beads mill, a high energy ball mill, a planetary mill, a stirred ball mill, a SPEX mill, an attrition mill, a magneto-ball mill, and a vibration mill.

The step of forming a core by applying a shear force to the mixed carbon material and silicon particles may be performed using equipment to which mechanical shear force is applied. For example, the equipment may include equipment capable of applying shear force, a high-speed rotary mill, or the like.

According to one example embodiment, pores may be formed inside the carbon material by the shear force, and the silicon particles may be penetrated into the carbon material.

The pores may serve as a buffer to suppress volume expansion due to swelling of the silicon particles, and the silicon particles may be physically bonded to the inside of the carbon material by shear force.

The silicon particles physically bonded to the inside of the carbon material are not separated from the carbon material unless a force corresponding to the applied shear force is applied, and thus may be uniformly distributed in the carbon-silicon composite.

Another aspect of the present disclosure provides a lithium-ion battery electrode including the carbon-silicon composite or a carbon-silicon composite prepared by the method of preparing a carbon-silicon composite.

According to one example embodiment, the electrode may have a volume expansion rate of 50% or less, and the volume expansion rate may be measured by comparing a thickness of an electrode measured before charging and discharging and the thickness of the electrode measured after 100 cycles of discharging based on 0.5 C-rate.

For example, the change in thickness may be measured through SEM image analysis, and the volume expansion rate of the electrode may be calculated using the equation as follows.

Volume expansion rate=(thickness of electrode after charge/discharge-thickness of electrode before charge/discharge/thickness of electrode before charge/discharge)×100

According to one example embodiment, the electrode may have a capacity of 600 mAh/g to 1,680 mAh/g.

Desirably, the electrode may have a capacity of 850 mAh/g to 1,500 mAh/g.

The capacity of the electrode corresponds to a capacity capable of suppressing the volume expansion rate to 20% or less while maximizing the silicon content.

According to one example embodiment, the electrode may have an initial Coulombic efficiency of 80% or more.

For example, the initial Coulombic efficiency of the electrode may be measured at a rate of 0.1 to 0.5C by mixing the carbon-silicon composite, a conductive material, and a binder at a ratio of 90 to 6:2 to 3:6 to 8, and then coating the copper foil with the mixture in a loading mass of 3 to 10 mg/cm 2.

According to one example embodiment, the lithium-ion battery electrode may be a lithium-ion battery anode.

The anode may be manufactured by a conventional method known in the art. For example, after mixing and stirring an anode slurry composition including the carbon-silicon composite and additives such as a binder and a conductive material to prepare an anode active material slurry, the anode may be manufactured by applying the anode active material slurry to the current collector, drying it, and then compressing it.

Hereinafter, the present disclosure will be described in more detail based on examples and comparative examples.

However, the following example is only for illustrating the present disclosure, and the present disclosure is not limited to the following example.

EXAMPLE

Graphite (Tokai Carbon Co., Ltd, BTR, etc.) was subjected to a mechanical pulverization process, and then mixed with silicon particles having a diameter of 20 nm to 100 nm at a ratio of 7:3.

A shear force was applied to the mixture with a high-speed rotary mill to form a core in which silicon was uniformly distributed inside graphite.

The surface of the formed core was coated with pitch to form a surface coating layer (shell), and heat was applied to the surface coating layer to prepare a graphite-silicon composite.

Experimental Example 1. Analysis of Graphite-Silicon Composite Particle Size Distribution A particle size distribution analysis was performed on a graphite-silicon composite according to an embodiment.

Referring to FIG. 1, it may be confirmed that a graphite-silicon composite according to an embodiment of the present disclosure exhibits a particle size distribution in which the range of D10 to D90 is 2.16 to 11.1 μm, and the D50 is 4.52 μm.

As described above, since it may cause a decrease in capacity if the size of the carbon-silicon composite is less than 3 μm, a carbon-silicon composite having a size of less than 3 μm was not used after being sieved in the graphite-silicon composite according to an embodiment of the present disclosure.

Experimental Example 2. SEM-EDS Analysis of Graphite-Silicon Composite

SEM-EDS analysis was performed on the graphite-silicon composite according to an embodiment.

SEM analysis was performed using JEOL Ltd.'s JSM-7600F, and the EDS measurement results at arbitrary points inside the composite are shown in Table 1.

TABLE 1

|    | Point 1 (wt %) | Point 2 (wt %) | Point 3 (wt %) |
| --- | --- | --- | --- |
| Si | 51.84 | 48.73 | 48.48 |
| C  | 48.16 | 51.27 | 51.52 |

Figure 2:
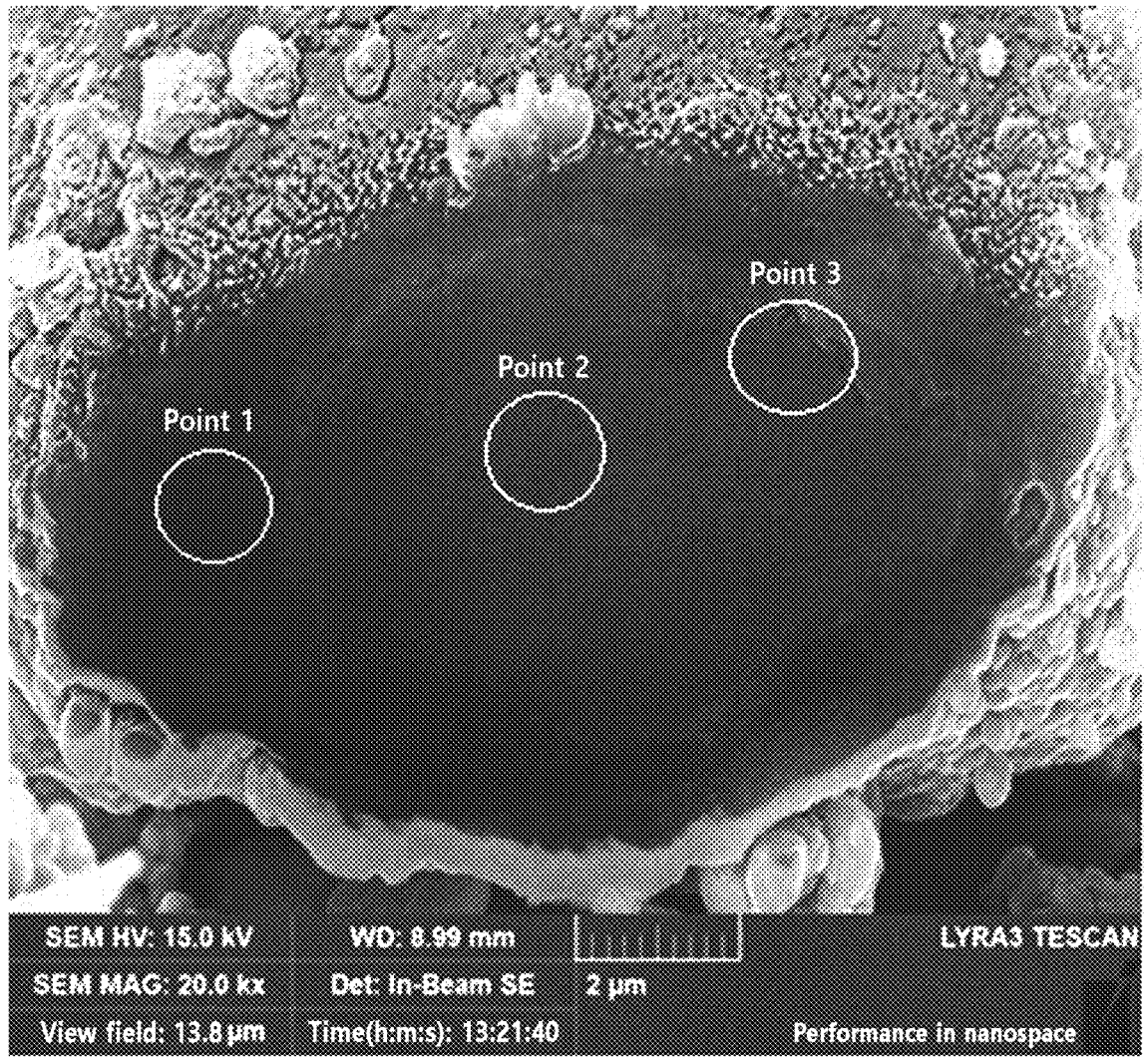
FIG. 2 is an SEM image showing a cross section and EDS analysis points of a graphite-silicon composite according to an embodiment of the present disclosure.
Figure 3:
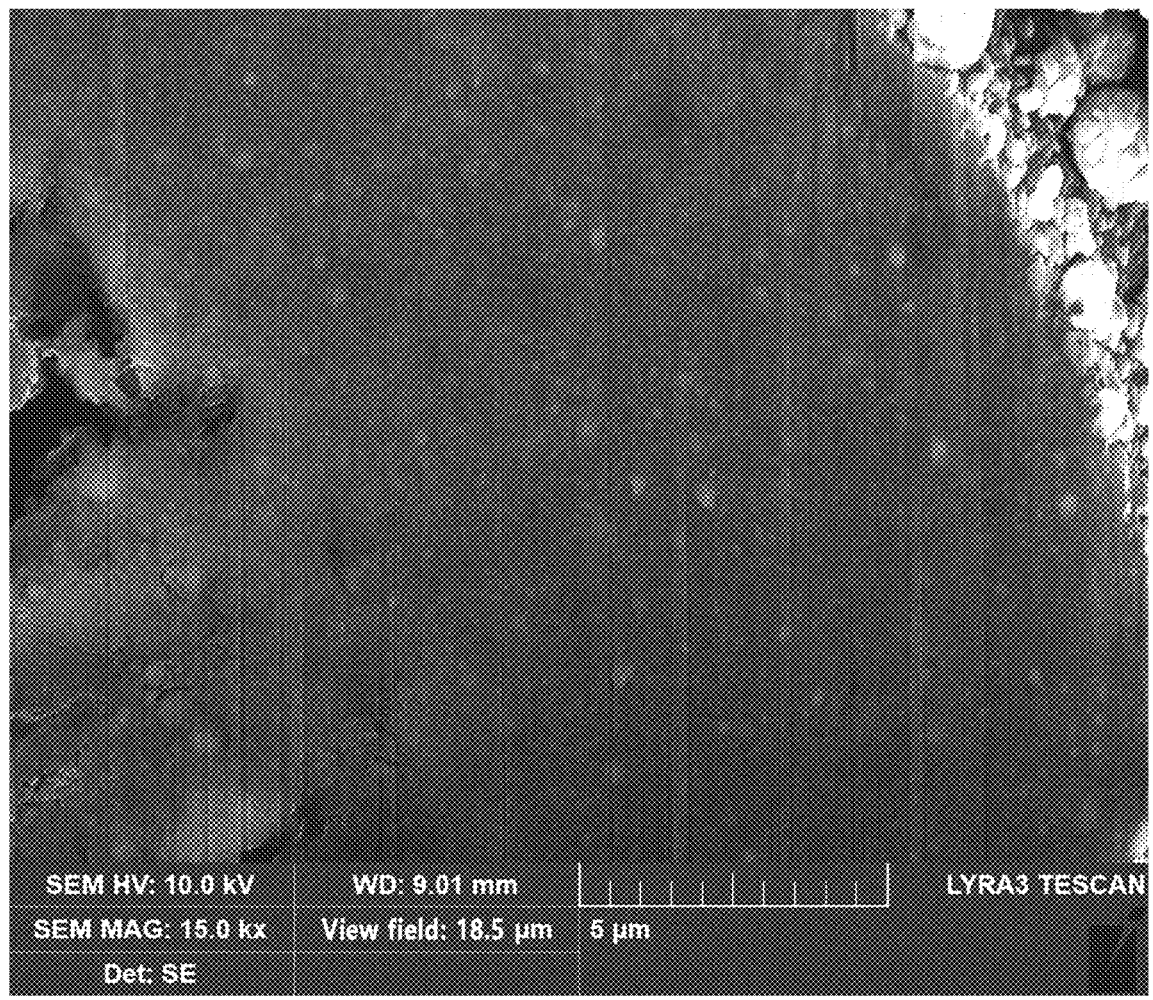
FIG. 3 is a cross-sectional SEM image of a graphite-silicon composite according to an embodiment of the present disclosure.

FIGS. 2 and 3 are an SEM image showing EDS analysis points, and a cross-sectional image of a graphite-silicon composite according to an embodiment of the present disclosure. The EDS analysis points in the SEM image of FIG. 2 correspond to point 1 (left), point 2 (center), and point 3 (right), respectively.

Referring to Table 1 and FIGS. 2 to 3, it may be confirmed that the graphite-silicon composite according to an embodiment of the present disclosure is a form in which it is formed of a core and an outer shell made of graphite and silicon, and it may be confirmed that the content of silicon from the center to the surface of the graphite-silicon composite is almost uniformly shown.

Looking specifically, it may be confirmed in FIG. 2 that the difference in content ratio of silicon between point 2, which is the center of the carbon composite, and point 1, which is close to the surface, is only 3.68%, and it may be confirmed in FIG. 3 that silicon particles are white dots, and they are evenly distributed inside the core.

Experimental Example 3. EDS Analysis of Electrode formed of Graphite-Silicon Composite After forming an electrode using the graphite-silicon composite of Example, EDS analysis was performed.

The EDS measurement results inside the electrode are shown in Table 2.

TABLE 2

| | wt % |
|---|---|
| Si | 51.10 |
| C | 48.90 |
| TOTAL | 100 |

Figure 4:
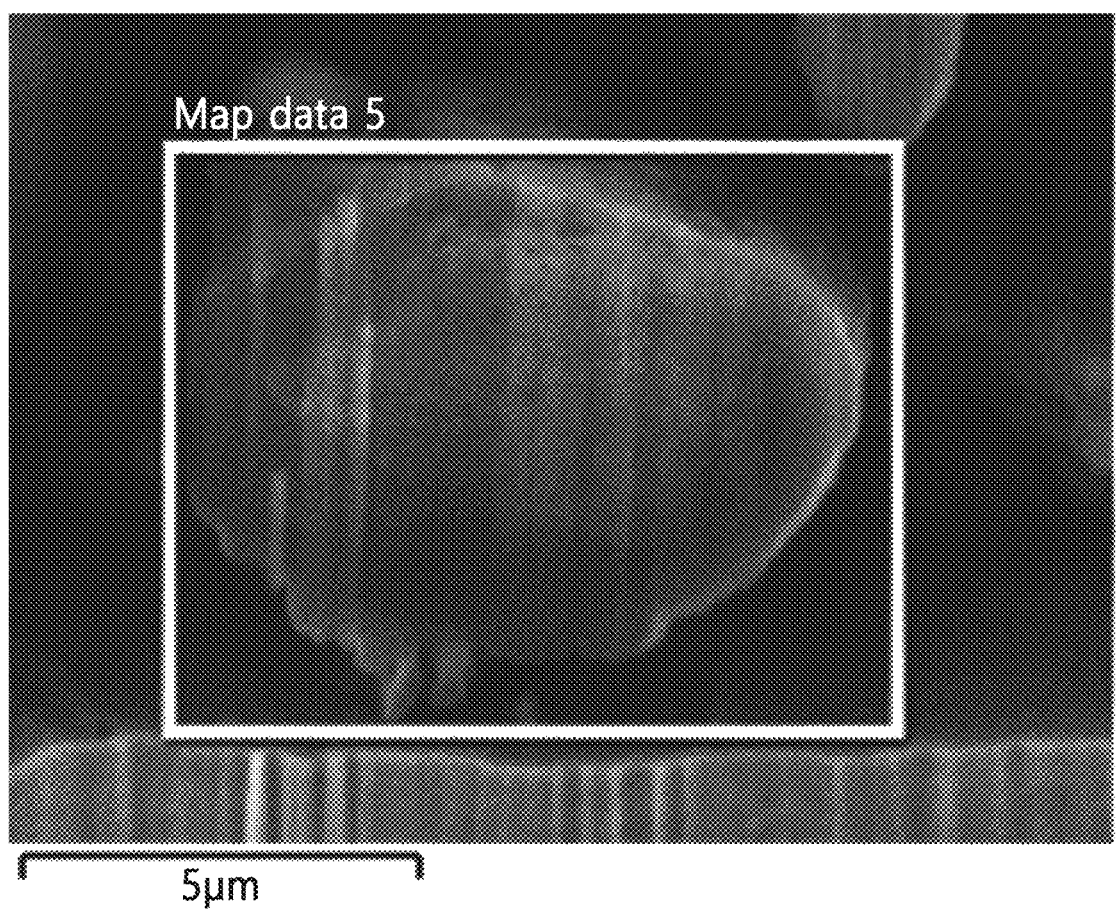
FIG. 4 is an electronic image of a graphite-silicon composite in an electrode formed of the graphite-silicon composite according to an embodiment of the present disclosure.

FIG. 4 is an electronic image of a graphite-silicon composite in an electrode formed of the graphite-silicon composite according to an embodiment of the present disclosure.

Figure 5:
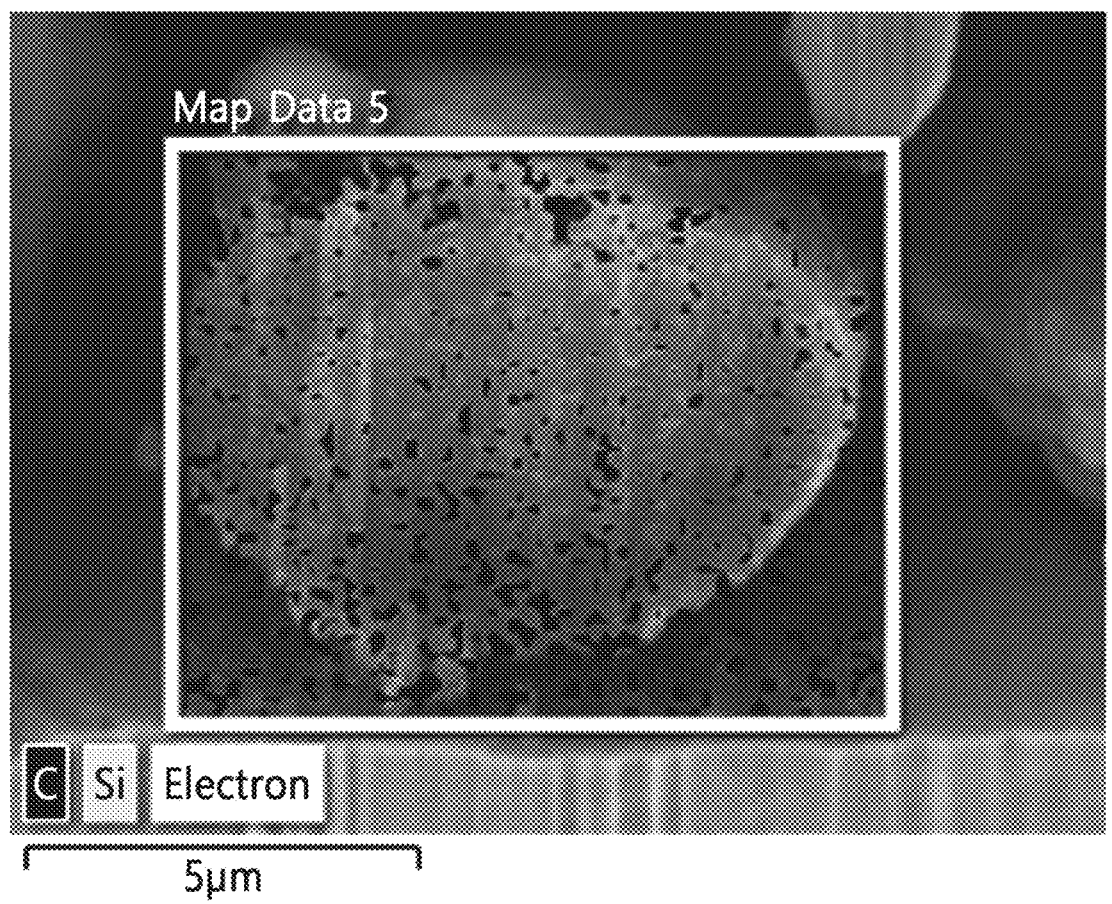
FIG. 5 is an EDS layered image of a graphite-silicon composite in an electrode formed of the graphite-silicon composite according to an embodiment of the present disclosure, where blue represents silicon, and red represents carbon.

FIG. 5 is an EDS layered image of a graphite-silicon composite in an electrode formed of the graphite-silicon composite according to an embodiment of the present disclosure, where blue represents silicon, and red represents carbon.

Figure 6:
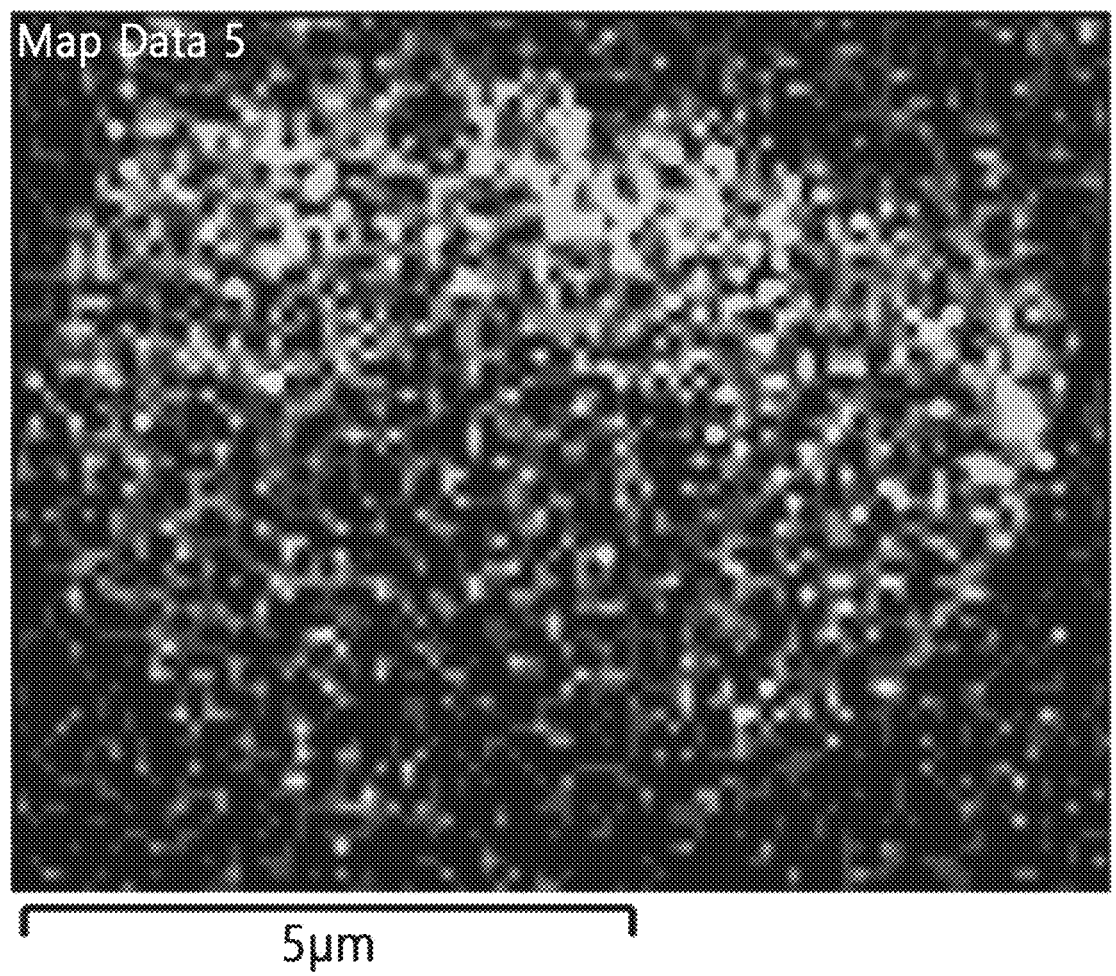
FIG. 6 is an EDS layered image showing silicon distribution of a graphite-silicon composite in an electrode formed of the graphite-silicon composite according to an embodiment of the present disclosure.

FIG. 6 is an EDS layered image showing silicon distribution of a graphite-silicon composite in an electrode formed of the graphite-silicon composite according to an embodiment of the present disclosure.

Figure 7:
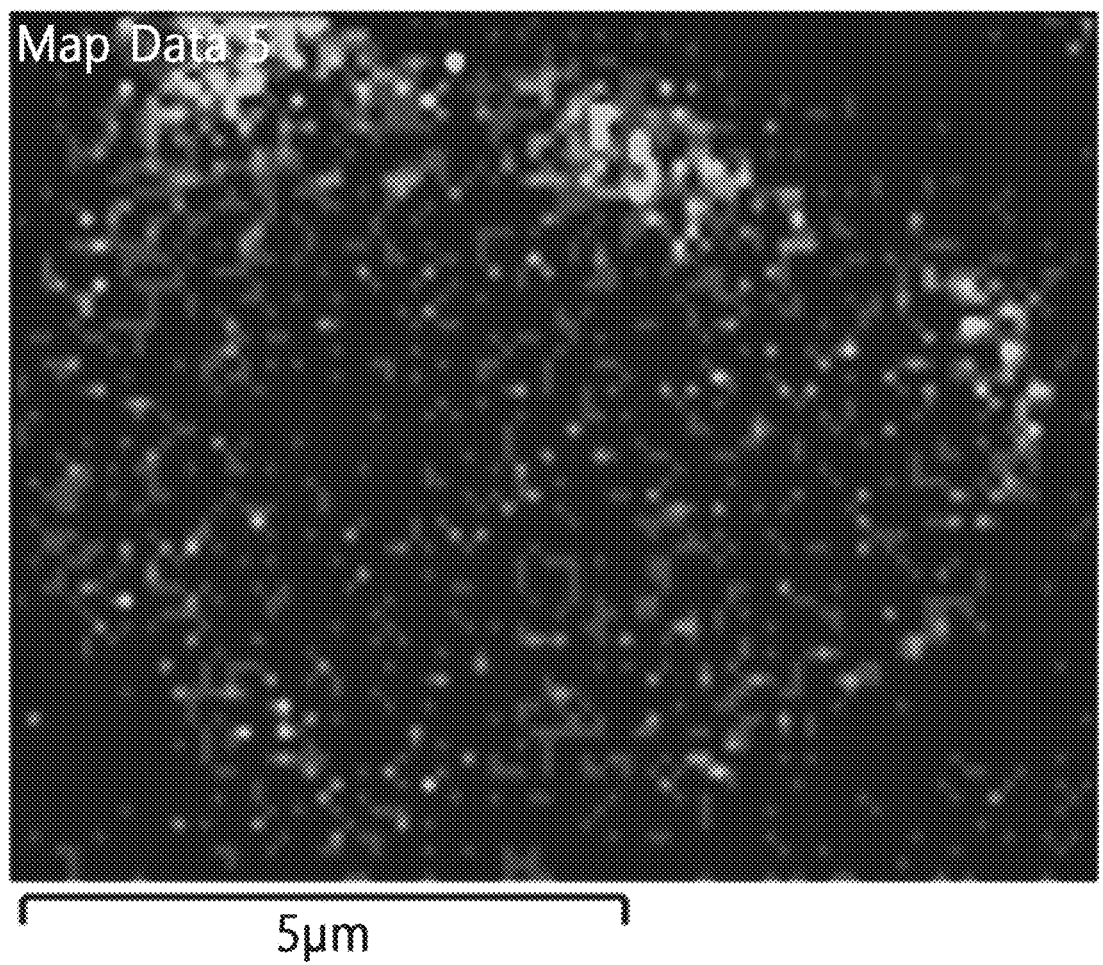
FIG. 7 is an EDS layered image showing carbon distribution of a graphite-silicon composite in an electrode formed of the graphite-silicon composite according to an embodiment of the present disclosure.

FIG. 7 is an EDS layered image showing carbon distribution of a graphite-silicon composite in an electrode formed of the graphite-silicon composite according to an embodiment of the present disclosure.

Referring to Table 2 and FIGS. 4 to 7, it may be confirmed that even in the graphite-silicon composite in the electrode after forming the electrode, uniform silicon distribution is maintained, and the silicon content is shown to be about 50%.

Experimental Example 4. Measurement of Volume Expansion Rate of Electrode formed of Graphite-Silicon Composite The thickness of the electrode formed using the graphite-silicon composite according to an embodiment and the thickness of the electrode after 100 cycles of discharging based on 0.5 C-rate were measured through SEM image analysis to confirm the volume expansion rate.

At this time, the thicknesses were measured by using a Forced Ion Beam (FIB, TESCAN 59000G/OXFORD EDS Dual beam FIB (Ga LMIS)) after cross-section cutting, and confirmed through SEM images.

Figure 8:
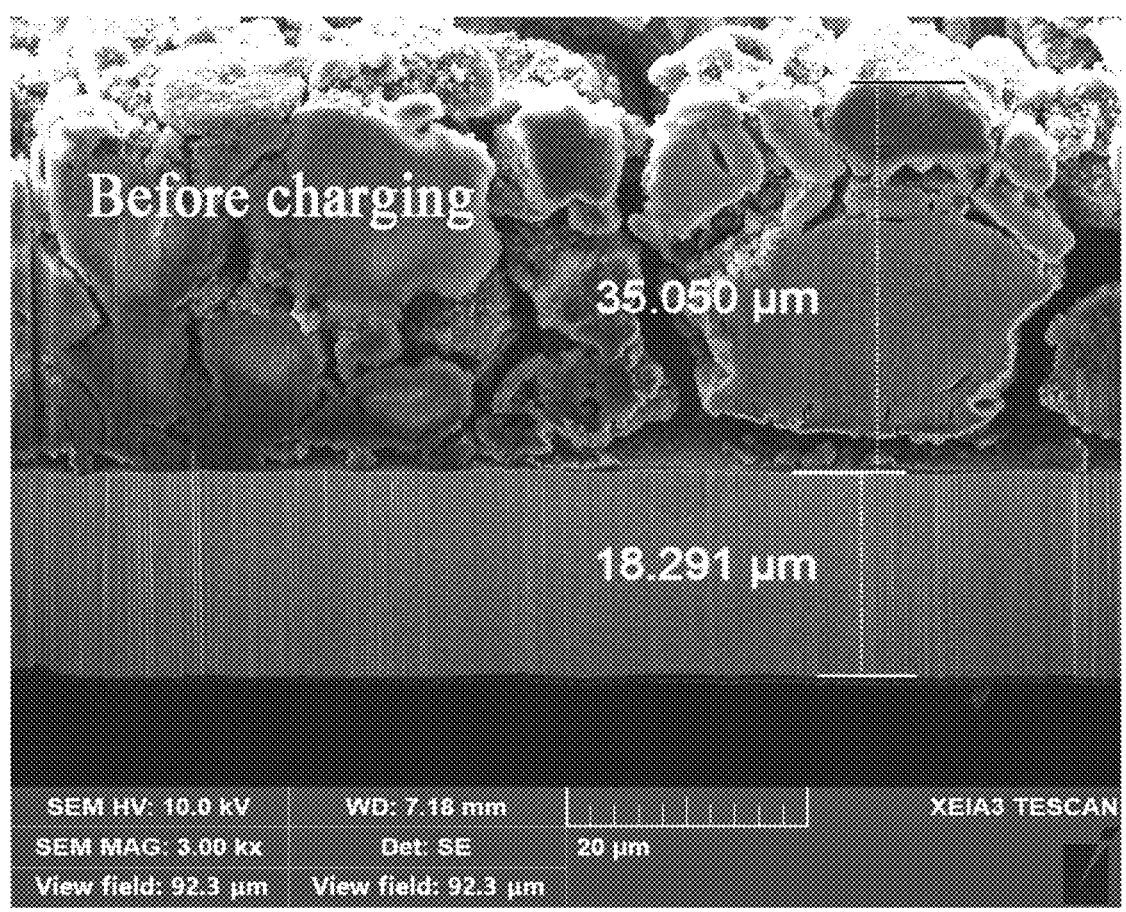
FIG. 8 is an SEM image before charging and discharging of an electrode formed of a graphite-silicon composite according to an embodiment of the present disclosure.

FIG. 8 is an SEM image before charging and discharging of an electrode formed of a graphite-silicon composite according to an embodiment of the present disclosure.

Figure 9:
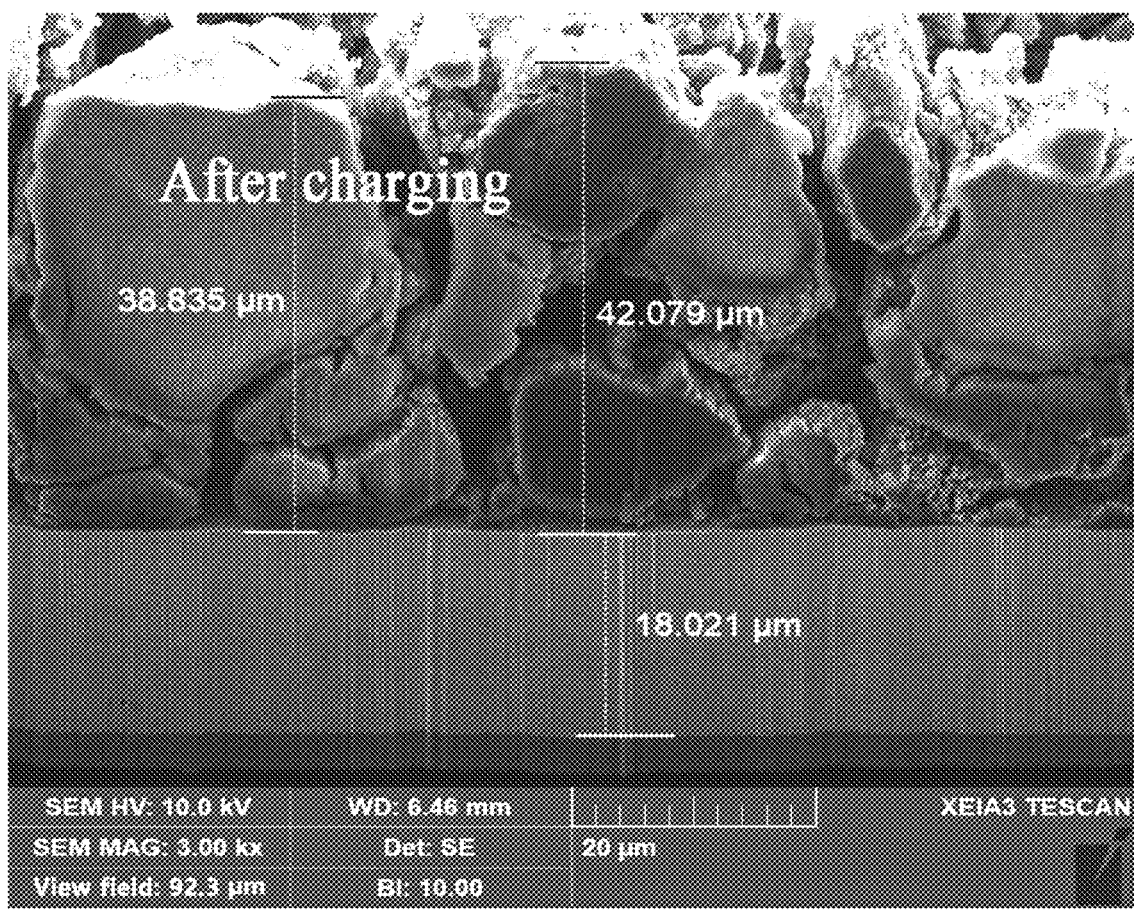
FIG. 9 is an SEM image after charging and discharging of an electrode formed of a graphite-silicon composite according to an embodiment of the present disclosure.

FIG. 9 is an SEM image after charging and discharging of an electrode formed of a graphite-silicon composite according to an embodiment of the present disclosure.

Referring to FIGS. 8 and 9, it may be confirmed that the thickness of the electrode before charging and discharging is about 35 μm, and the thickness of the electrode after charging and discharging for 100 cycles is about 39 lam to 42 μm.

That is, the graphite-silicon composite according to the present disclosure shows a volume expansion rate of 10% to 20% after charging and discharging, and thus, it may be seen that the volume expansion by silicon is significantly suppressed.

Although the embodiments have been described by limited drawings as described above, one of ordinary skill in the art may apply various technical modifications and variations based on the above-mentioned description. For example, although described techniques are carried out in an order different from a described method, and/or described constituent elements are coupled or combined in a form different from the described method, or replaced or substituted by other constituent elements or equivalents, appropriate results may be accomplished. Therefore, other implementations, other embodiments, and equivalents to the claim scope also belong to the scope of the following claims.

The invention claimed is:

1. A carbon-silicon composite comprising:
   a core containing a carbon material and silicon particles; and
   a shell formed on a surface of the core and comprising amorphous carbon, crystalline carbon, or both,
   wherein the silicon particles are uniformly distributed from the center to the surface of the core,
   wherein a difference between a silicon particle content ratio at a portion within 20% from the center of the core in a distance from the center to the surface of the core in the core and a silicon particle content ratio at the other portion of 80% from the center of the core is less than 5%,
   wherein the crystalline carbon is included in the shell in an amount of 40 wt % to 60 wt %.

2. The carbon-silicon composite of claim 1, wherein the silicon particles are contained in the core in an amount of 10% by weight (wt %) to 50 wt %.

3. The carbon-silicon composite of claim 1, wherein the carbon material and the silicon particles have a content ratio of 9:1 to 1:1.

4. The carbon-silicon composite of claim 1, wherein the silicon particles have a size of 20 nm to 100 nm.

5. The carbon-silicon composite of claim 1, wherein the carbon material comprises at least one selected from the group consisting of natural graphite, artificial graphite, soft carbon, hard carbon, carbon black, acetylene black, Ketjen black, carbon fiber, carbon nanotube, graphene, and expanded graphite.

6. The carbon-silicon composite of claim 1, wherein the carbon-silicon composite has a size of 3 μm to 12 μm.

7. The carbon-silicon composite of claim 1, wherein the carbon-silicon composite has a porosity of 1% to 10%.

8. A method of preparing a carbon-silicon composite, the method comprising:
   mixing a carbon material and silicon particles;
   forming a core by applying a shear force to the mixed carbon material and silicon particles;
   forming a shell by applying a coating solution containing amorphous carbon to a surface of the core; and
   crystallizing a portion or all of amorphous carbon by applying heat to the formed shell,
   wherein the silicon particles are uniformly distributed from the center to the surface of the core,
   wherein a difference between a silicon particle content ratio at a portion within 20% from the center of the core in a distance from the center to the surface of the core in the core and a silicon particle content ratio at the other portion of 80% from the center of the core is less than 5%, wherein the crystalline carbon is included in the shell in an amount of 40 wt % to 60 wt %.

9. The method of claim 8, wherein the carbon material has pores formed therein by the shear force, and the silicon particles are penetrated into the carbon material.

10. A lithium-ion battery electrode comprising the carbon-silicon composite of claim 1.

11. The lithium-ion battery electrode of claim 10, wherein the electrode has a volume expansion rate of 50% or less, and the volume expansion rate is measured by comparing a thickness of an electrode measured before charging and discharging and the thickness of the electrode measured after 100 cycles of discharging based on 0.5 C-rate.

12. The lithium-ion battery electrode of claim 10, wherein the electrode has a capacity of 600 mAh/g to 1,680 mAh/g.

13. The lithium-ion battery electrode of claim 10, wherein the electrode has an initial Coulombic efficiency of 80% or more.

\* \* \* \* \*